United States Patent [19]
Lemke et al.

[11] 3,932,888
[45] Jan. 13, 1976

[54] APPARATUS FOR MODIFYING THE TIME BASE OF SIGNALS

[75] Inventors: James U. Lemke; Robert A. Lentz, both of Del Mar; Charles E. Wright, Solana Beach, all of Calif.

[73] Assignee: Eastman Technology, Inc., Rochester, N.Y.

[22] Filed: June 10, 1974

[21] Appl. No.: 477,583

[52] U.S. Cl. ............................................. 360/36
[51] Int. Cl.² ...................................... H04N 5/79
[58] Field of Search .............. 360/26, 27, 36, 51; 178/69.5 DC, 69.5 TV, 69.5 F, 6.6 TC; 358/8, 4; 307/221 R, 221 C, 221 D, 238, 293, 304; 340/173 R

[56] References Cited
UNITED STATES PATENTS

| | | | |
|---|---|---|---|
| 3,197,739 | 7/1965 | Newman | 360/26 |
| 3,666,880 | 5/1972 | Krause | 360/36 |
| 3,749,837 | 7/1973 | Doughty | 360/36 |
| 3,761,646 | 9/1973 | Beauviala | 360/36 |
| 3,860,952 | 1/1975 | Tallent et al. | 358/8 |
| R25,405 | 6/1963 | Witt et al. | 360/51 |

*Primary Examiner*—Raymond F. Cardillo, Jr.
*Attorney, Agent, or Firm*—R. Cody

[57] ABSTRACT

Time base instability of signals in a train thereof is corrected by use of analog shift registers. As employed in the correction of time base instability of video signals, plural analog shift registers are used. Two clock rates are used, respectively, to clock video signals into and out of the analog shift registers. The clock-in rate is set so that samples of a video signal which has been stretched a predetermined amount may load all stages of an analog shift register within the duration of the stretched signal. The clock-out rate is set to unload all stages of an analog shift register within the nominal duration of a video signal.

10 Claims, 4 Drawing Figures

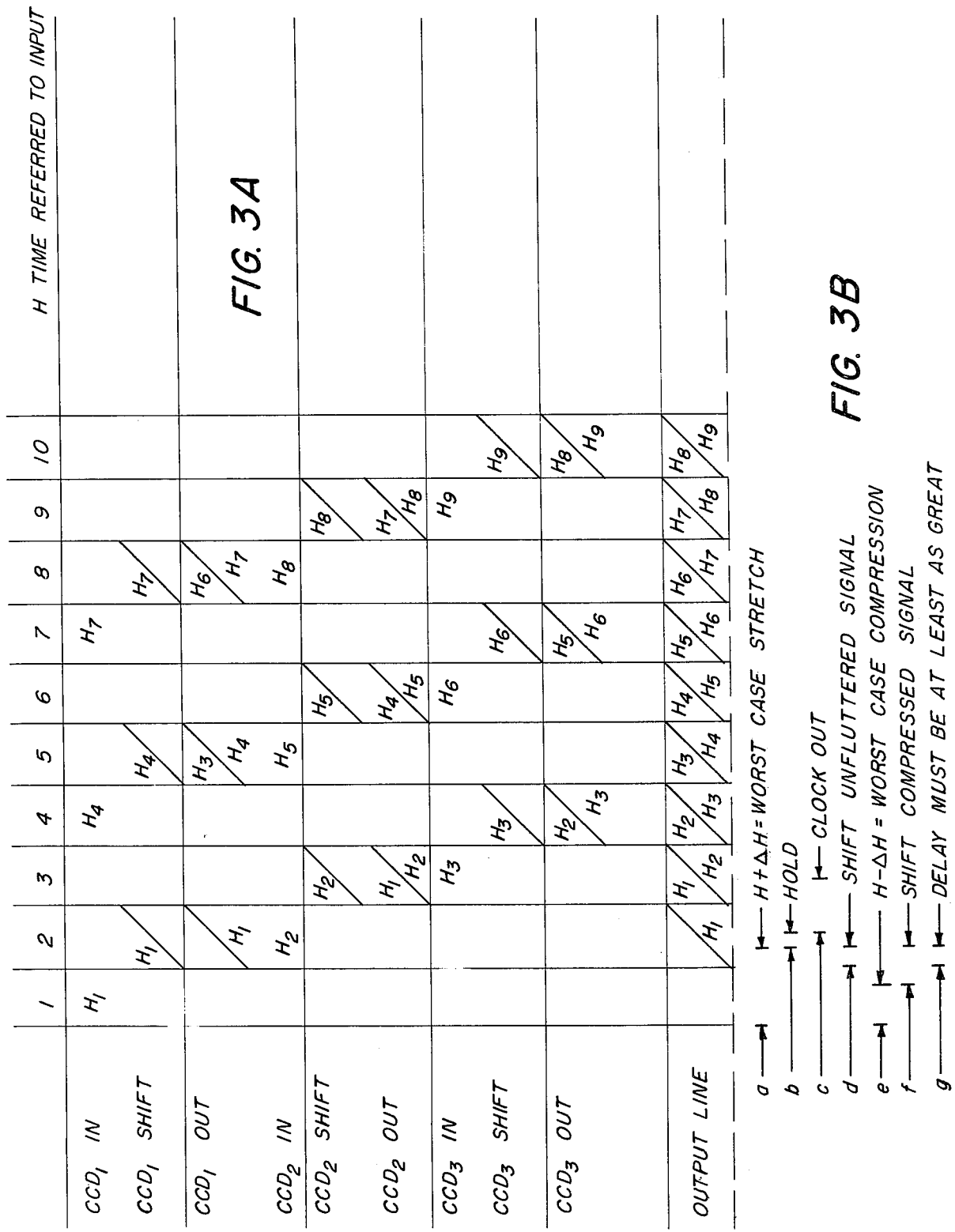

APPARATUS FOR MODIFYING THE TIME BASE OF SIGNALS

BACKGROUND OF THE INVENTION

1. Field of the Invention

This invention relates in general to apparatus for modifying the time base of signals in a train thereof; more particularly, the invention is concerned with apparatus for correcting a time base instability in TV-type signals.

2. Description Relative to the Prior Art

While the invention is not so restricted, its utility as a flutter compensator in a video tape recorder dramatically indicates its significance. The playback of a taped video recording requires faithful replay of recorded signals without causing such signals to shift unwantedly and continuously in frequency. Unwanted frequency modulation of playback video signals can, among other things, cause (1) the sync information content of the video signal to become unstable, and (2) the color information content of the video to become, at best, faulty, i.e., color information may not be detectable at all, since unstable playback of recorded color burst information within the video signal may cause the color content of the video signal to be lost entirely.

The degree of unwanted frequency shift during playback of the video signal is measured in terms of "percent flutter," it being recognized that even fractional percent flutter will prevent the AFC circuits of most TV's from tracking the fluttering sync signal, resulting in the tearing apart of the visual display that corresponds to the playback signal. Percent flutter may be defined as 100 times a change in frequency divided by a nominal frequency, the nominal frequency in the present case being 15,750 Hz.

To assure against instantaneous time base instability of played back TV signals which are derived from a video tape recorder, present practice is to employ extremely close tolerances in the precision parts of the recorder and to complement such tolerances with various servo controls which actively prevent flutter from occurring during playback. Such practices greatly add to the cost of manufacturing video tape recorders and, indeed, have prevented video recorders from being cost-wise within reach of many who would otherwise want them. This being the case, various proposals have been made to utilize variable delay lines, e.g., U.S. Pat. Nos. 2,960,568; 3,238,300; and 3,580,991, as a way to nullify flutter within playback signals: flutter within the played back signals is detected; the "flutter" signal is then used to vary the delay of a delay line through which the fluttering signal is passed, thereby causing the output of the delay line to be, hopefully, a flutter-free equivalent of the fluttering input to the delay line.

Copending U.S. application Ser. No. 432,363 discloses a departure from the above-noted delay line concept, having, at the heart thereof, an analog shift register. Basically, copending Ser. No. 432,363 teaches (1) the clocking (sampling) of a fluttering signal into an analog shift register at a rate dependent on the degree of flutter, and (2) the clocking of such signal samples out of such analog shift register at a desired rate. If the desired rate is constant, flutter is nullified. On the other hand, the clock-out rate may be a variable, whereby the signal output of the analog shift register may be modified according to choice.

In utilizing the teaching of Ser. No. 432,363 to process signals such as TV type signals, i.e., signals which are continuous and which have a nominal periodicity, plural analog shift registers, say two, are used and so cooperate that while one TV line signal is clocked into one register at a flutter-dependent rate, the signal within the other register is clocked out of such register at a known, but stable, rate, and vice versa.

As is known, analog shift registers may take a variety of forms such, for example, as charge coupled and charge injection devices, various serially disposed sample-and-hold circuits, and even A/D and D/A converters which functionally sandwich digital shift registers.

SUMMARY OF THE INVENTION

Recognizing that time base stability in the lead portion of, say, a TV-type signal is of more consequence than time base stability in the mid or trailing parts of such a signal (i.e., the lead signal portion contains the color burst information and also critically affects horizontal synchronization of a TV set, whereas time base shift in mid or trailing signal portions causes the mere shift of visual scene content — which will frequently occur off the face of the TV, and/or be relatively unnoticeable, anyway), the present invention obviates the need, as in Ser. No. 432,363, for a variable frequency clock to load an analog shift register at a flutter dependent rate and, instead, employs a fixed clock in combination with variable loading of an analog shift register(s). In a somewhat broad sense, then, the present invention proposes the following as a way to nullify the effects of time base instability: Successively clock periodically occurring signals which may be subject to time base instability, and which have a nominal duration and periodicity, into an analog shift register by means of a fixed clock having a frequency which is just sufficient to shift the first sample of each signal to the output stage of the analog shift register within the duration of each such signal whereby, for each periodic signal, samples will appear in a number of the stages of the analog shift register in proportion to the degree that each such signal is stretched time-wise. Then, in response to a reference pulse train having time base stability, unload the analog shift register of its samples at a clock rate which will unload all stages of the analog shift register within the nominal duration, thereby causing (1) the lead part of all of the periodically occurring signals to have time base stability, and (2) those periodic signals, which before processing were stretched, to have the nominal duration after processing, all other post-processed signals having durations which are less than the nominal duration by tolerable amounts. Such a technique may, assuming the time spacing between the periodic signals is sufficiently long, as above, be implemented by a single analog shift register, i.e., all periodic signals are clocked into and out of the same analog shift register. In the event the time spacing between the periodic signals is short, however, or nonexistent as in the case of video signals, plural analog shift registers are employed, i.e., while one analog shift register is loaded at one clock rate, another analog shift register — storing a prior signal — is unloaded at a higher clock rate.

In a preferred embodiment of the invention, as might be employed to remove flutter from a TV signal train derived from the playback of magnetic tape or the like, the invention employs three analog shift registers, e.g., charge coupled devices (CCDs) to store, respectively, samples of every third video line signal (which signals shall be taken to include both video and sync information) in a signal train: The first video signal is clocked into the first CCD at a first clock rate; then the second video signal is clocked into the second CCD at the first clock rate, and while such occurs, the signal in the first CCD is clocked out of the first CCD at a second rate which will assuredly clear all stages of the first CCD during the time of an unfluttered video signal; then the third video signal is clocked into the third CCD at the first clock rate, and while such occurs, the signal in the second CCD is clocked out of the second CCD at the second clock rate; then the signal in the third CCD is clocked out of the third CCD at the second clock rate, and while this occurs, the fourth video signal is clocked into the first CCD at the first clock rate, and so on. By so selecting the first clock rate that a "worst case" stretched video signal fully loads all stages of a CCD with signal samples within the duration of the "worst case" signal, each CCD will be more or less, starting with its output stage, periodically loaded with signal samples, the number of which is in proportion to the degree of stretch that the corresponding video signal experiences. Attendantly, this means that, as the CCD's are successively unloaded at the horizontal sync rate, there will be no flutter of the critical sync portions of the video signals clocked out of the CCD's; and whatever flutter remains within the clocked-out signals will virtually unnoticeably occur in the visual part of, and more particularly be off the right-hand side of, the TV picture.

OBJECTIVES OF THE INVENTION

To provide apparatus for modifying the time base of signals.

To provide a technique for stabilizing the time base of critical signals in a train thereof and, more particularly, to provide a technique for stabilizing the time base of sync signals in a TV signal train.

To provide apparatus for nullifying the effects of flutter during the playback of recorded video information.

The invention will be described with reference to the figures, wherein:

FIGS. 3A and 3B are timing diagrams useful in explaining the operation of the embodiment of FIG. 2.

Figure 1:
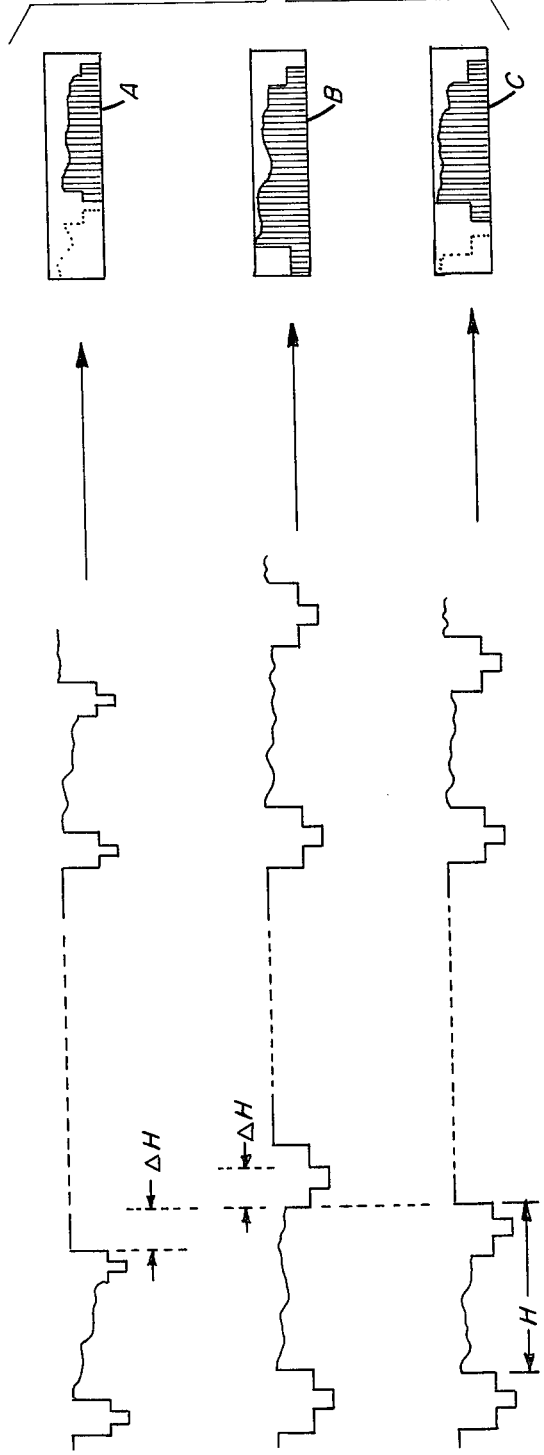
FIG. 1 is a diagram useful in describing the invention.

Before embarking on an apparatus-oriented description of the invention, the basic philosophies employed in implementing the invention will be discussed in relation to FIG. 1. A TV signal waveform is depicted as having, in succession, line signals (H − ΔH) that are compressed in duration, line signals (H + ΔH) that are stretched in duration a maximum tolerable amount (ΔH), and line signals (H) having normal durations, which in the case of an NTSC signal format is nominally 63.5 $\mu$ sec. Three analog shift registers A, B, C are pictorially indicated as storing respective samples of the compressed (H − ΔH), stretched (H + ΔH), and normal (H) signals. Given that the clock which samples and feeds the three signals respectively into the analog shift registers A, B, C is the same, and has a clock rate that is sufficient to load the stretched signal fully into the analog shift register B within the duration of such signal, the compressed and normal signals (H − ΔH) and (H) will get shifted — within respective durations which are the same as the duration of the stretched signal — to occupy less than all of the stages of their respective analog shift registers A and C, from output end toward input end, and in proportion to their respective durations relative to the duration of the stretched signal. With the sync-identifying start of each signal (H − ΔH), (H + ΔH), and (H) so defined by the analog shift registers, i.e., at the output stage of each analog shift register, the signals in the analog shift registers are, as will be described below in detail, successively clocked out at a rate which will fully unload all stages of each analog shift register within the nominal period of the video line signal, i.e., 63.5 $\mu$sec. Thus, the sync information reappears precisely at the nominal frequency, and whatever flutter remains in the clocked-out video information content of each line signal causes, when displayed by a TV, either no apparent visual shift of scene content, or a shift which appears just behind the right-hand side of the mask found on most TV sets.

It is known that approximately 200 evenly-spaced samples of video information per horizontal scan line evenly spaced provide good resolution of the TV image at normal viewing distance. Because of the relative availability of 256-stage CCD's (i.e., 256 = $2^8$), the invention employs such CCD's as analog shift registers, utilizing those CCD stages in excess of approximately 200 as "relief" for a fluttering TV signal: Assuming that the maximum expected flutter is 10 percent, then a 63.5 $\mu$ sec signal will periodically be stretched to 69.9 $\mu$ sec; and compressed to 57.1 $\mu$ sec. This means that if a 256-stage CCD is to store the fully stretched signal, then 256 stages per 69.9 × $10^{-6}$ seconds will define the frequency (3.66 Mhz.) necessary to clock such stretched signal into, and fully load, the CCD; which is to say that a frequency of 3.66 Mhz. will shift a video signal which is not so stretched so that the sync portion of such signal resides at the output stage of the CCD. To unload the 256-stage CCD in 63.5 $\mu$ sec requires a clock-out rate of 4.03 Mhz. Thus, the clock-in frequency for processing a nominally 63.5 $\mu$ sec video signal may be defined:

$$f_{clock-in} = \frac{N}{63.5 \times 10^{-6}(1+D)},$$

wherein $N$ equals the number of analog shift register stages and $D$ equals the peak level of fractional flutter which could be expected to occur; and the clock-out frequency for such a video signal may be defined:

$$f_{clock-out} = \frac{N}{63.5 \times 10^{-6}}$$

Figure 2:
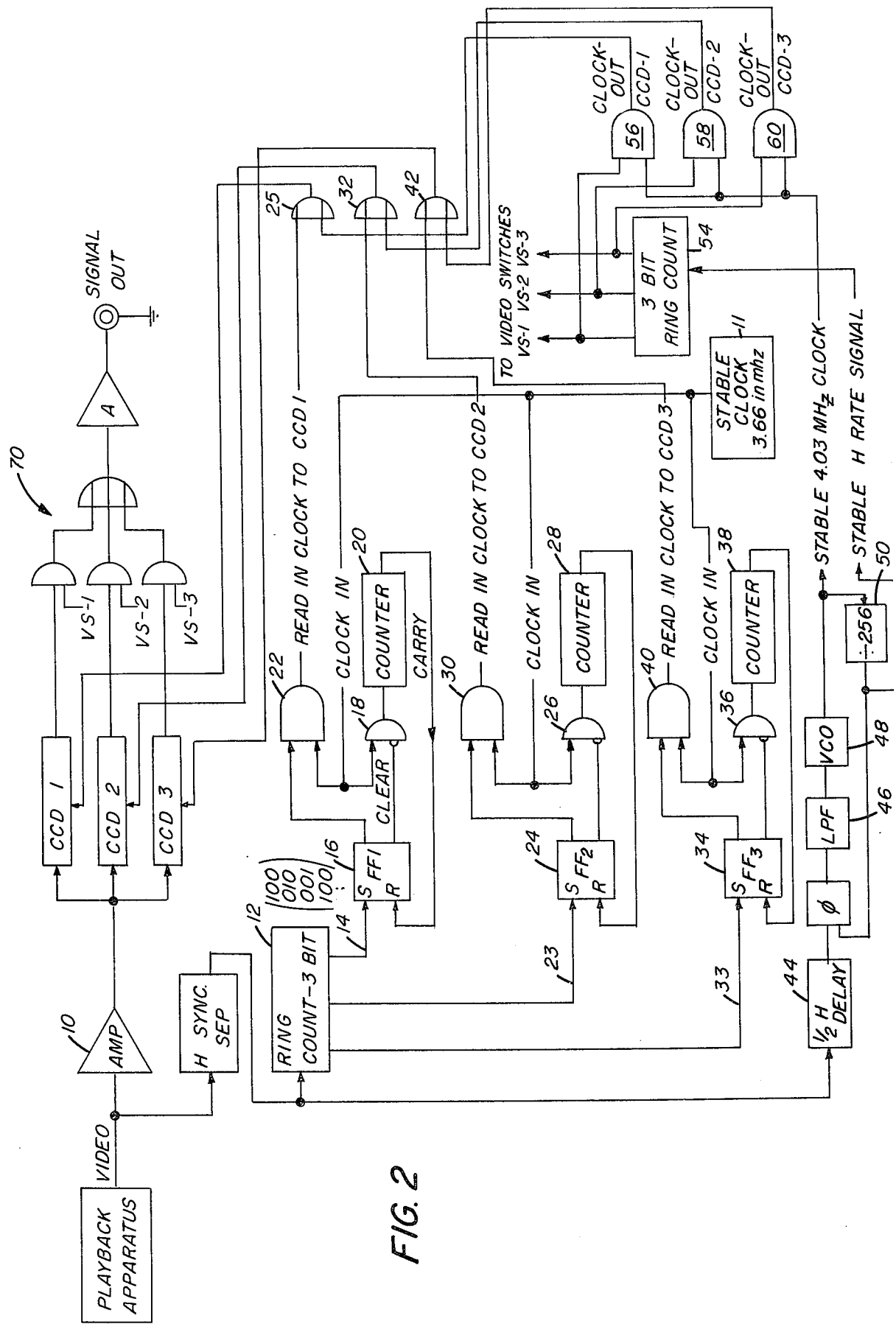
FIG. 2 is a schematic diagram illustrating a presently preferred embodiment of the invention.

Keeping in mind the clock-in and clock-out frequency as defined above, and the teaching which was characterized in relation to FIG. 1, reference should now be had to FIGS. 2 and 3: A video signal train — including sync information — as may be supplied during playback of a video tape recorder, and which may be subject to flutter, is applied to first, second, and third CCD's (1, 2, 3) respectively, via an amplifier 10. The sync information is also applied to a three-bit ring counter 12 which serves as a basic control for clocking discrete line representative signals in the video signal train, respectively, and successively, into the first, second, third, first, second, etc, CCD's. In other words, the output of the ring counter 12 tracks whatever flutter is in the incoming video signal train. When, for example, the ring counter 12 has an output on its lead 14, a flip-flop 16 is set, removing an INHIBIT signal from a gate 18 and causing clock-in pulses at 3.66 Mhz. (source 11) to be applied to a 256-stage counter 20, and to the CCD 1 via AND and OR gates 22 and 24, respectively. As soon as 256 shift-producing pulses have been applied to the CCD 1, at which time the lead portion of the first video line signal will have been shifted to the output stage of the CCD 1, the counter 20 carry-output resets the flip-flop 16 to end the application of clock-in pulses to the CCD 1. Thus, the first video line signal gets so clocked into and shifted within the CCD 1 that the sync portion of the first video line signal lodges at the output stage of the first CCD 1, irrespective of how much the video line signal has been stretched or compressed (i.e., as long as the stretch is less than the maximum level D defined above). Similarly, the second video line signal is clocked into the second CCD 2 by means of circuit components 23, 24, 26, 28, 30, and 32; and the third video line signal is clocked into the third CCD by means of circuit components 33, 34, 36, 38, 40, and 42; after which the fourth video signal is applied to the CCD 1, and so on.

In accordance with the invention, clock-out of the CCD's 1, 2, 3 does not occur until the lead sync portion of each discrete video line signal is assuredly stored in the output stage of a corresponding CCD; and to this end, the invention employs a delay device 44 — which in the present case provides a one-half H delay — to assure sufficient time for shifting the video line signal samples within the CCD's. Bearing such delay in mind, it appears useful at this point to refer to the timing diagram of FIG. 3. FIG. 3 is comprised of two parts, the upper part A being directed to overall system timing, and the lower part B showing durations which are referenced against the duration ($H_1$) of part A of FIG. 3. Taking the durations of part B up first, it is seen that:

a. A "worst case" stretched video signal spills timewise into time $H_2$.

b. With the one-half H delay provided by the delay device 44, all signals which start at time zero will be held until the middle of time $H_2$.

c. The time for clocking out a CCD is H.

d, e, f. Unfluttered and compressed signals get shifted within a CCD to locate their respective lead sync portions at the CCD output, after which they are held as in (b) above.

g. The delay provided by the delay device 44 must be at least great enough to assure that clock-out of a CCD, for example, does not occur until after the "worst case" stretched signal has been fully loaded into the CCD.

Now, turning to part A of FIG. 3 (wherein diagonals are employed to indicate first and second halves of H times), the theme expressed therein is that each video line signal which is clocked into a CCD is clocked out of that CCD in H = 63.5 $\mu$sec, and that such clock-out occurs during the clocking of the next occurring video line signal into a different CCD . . . the CCD shifting indicated in the legend of FIG. 3, part A, being that identified in paragraph (d), (e), (f) above. To assure clock-out of the 256-stage CCD's 1, 2, 3, as employed in the embodiment under discussion, a clock-out rate of 4.03 Mhz. is utilized.

Troublesome flutter is effectively removed from the delayed (44) horizontal sync pulses by a low-pass filter (DC to 0.1 Hz.) 46 within a phase lock loop including a voltage controlled oscillator (VCO) 48, the output of which is divided (50) by 256 to provide a signal frequency for comparison with the fluttering output of the delay 44. Thus, the VCO 48 provides a 4.03 Mhz. output signal frequency, and the divider 50 provides an H-rate signal frequency, both signal frequencies being without troublesome flutter frequencies.

The output of the oscillator 50 is applied to operate a three-bit ring counter 54 which, unlike the flutter-influenced output of the ring counter 12, produces an output that changes at precisely the H rate (but subject to the one-half H delay). The ring counter 54, via AND gates 56, 58, 60, causes the clock (4.03 Mhz.) from the oscillator 52 to be applied successively to the CCDs 1, 2, 3, via OR gates 25, 32, 42, whereby each CCD gets fully unloaded, via logic 70, in the 63.5 $\mu$ sec which occurs between the signals produced by the oscillator 50; and since each CCD unloads the lead portion of its stored sync signal at precisely the H rate, flutter is efficiently removed from the critical sync portion of each CCD-processed video signal. Indeed, by means of the invention, a TV responsive to such CCD-unloading will appear to embody a "driven" sync circuit. As noted above, those portions of video signals which are stored in CCD stages nearest the CCD inputs cause, when clocked out, only slight and relatively unnoticeable shift of visual scene content which, as stated above, will ordinarily occur behind the right-hand side of the mask found on most TV sets.

The invention has been described in detail with particular reference to preferred embodiments thereof, but it will be understood that variations and modifications can be effected within the spirit and scope of the invention.

What is claimed is:

1. Apparatus for processing a signal having a nominal duration and which may have been subjected to time-wise stretch or compression, comprising:

a. analog shift register means,
   b. means for clocking said signal into said analog shift register means at a first predetermined fixed clock rate, said fixed rate being sufficient to load all stages of said analog shift register means with samples of, and within the duration of, said signal when said signal has been subjected to time-wise stretch of a predetermined amount, whereby said analog shift register means may be loaded from its output end toward its input end with a number of signal samples that correspond with the degree of time-wise stretch or compression of said signal,
   c. means for producing an enabling signal, and
   d. means responsive to said enabling signal for clocking said signal samples out of said analog shift register means at a second predetermined fixed clock rate greater than said first fixed clock rate, said second fixed clock rate being sufficient to unload all stages of said analog shift register means within a predetermined duration.

2. Apparatus for assuring that the lead portions of information representative signals in a train thereof have the time base of a reference signal train, comprising:

a. an analog shift register,
   b. means for successively clocking at least some of said information representative signals into said analog shift register, the rate of said clock being fixed and such that an information signal which is stretched in duration a predetermined amount will fully load the stages of said analog shift register within the duration of said stretched signal, c. means for producing a reference signal train, and d. means responsive to said reference signal train for clocking signals out of said analog shift register, the rate of said clock-out signals being fixed and sufficient to unload fully the analog shift register within a predetermined duration that is shorter than the duration of said stretched signal.

3. Apparatus for removing flutter from video signals having a nominal periodicity, said apparatus comprising:

a. a plurality of analog shift registers, b. means for clocking video signals into said analog shift registers at a first fixed rate sufficient to load one of said analog shift registers fully with samples of a video signal that has been stretched time-wise a predetermined amount by said flutter, and within the duration of said stretched signal, c. means for clocking signal samples out of said analog shift registers at a second fixed rate that is sufficient to unload all stages of one of said analog shift registers within the period of a video signal which has not been stretched time-wise, and d. logic means cooperative with said analog shift registers for enabling samples of one video signal to be clocked into one analog shift register at said first rate, and for simultaneously enabling signal samples of a previously occurring video signal which are stored within another analog shift register to be clocked out of said other analog shift register at said second clock rate.

4. Apparatus for processing video signals which may be subject to the time-wise stretch and compression thereof, comprising:

a. a plurality of analog shift registers, b. means for clocking said video signals successively and respectively into said analog shift registers, the clock rate being a predetermined fixed amount that is such that samples of a video signal which has been stretched a predetermined amount will load all of the stages of an analog shift register during the time span of such stretched signal, c. means for clocking signal samples out of said analog shift registers at a second higher fixed rate which will unload all samples of a signal which has been stretched said predetermined amount within the duration of a video signal which has neither been stretched nor compressed, and d. logic means for enabling the selective clocking of one video signal into one analog shift register and for enabling the simultaneous clocking of a signal which is within another analog shift register out of said other analog shift register.

5. Signal processing apparatus comprising:

a. a plurality of substantially identical analog shift registers, b. first clock signal producing means, the clock having a fixed rate which is such that samples of an information signal of a predetermined duration may be loaded by means of said first clock signal into all stages of one of said analog shift registers within the duration of the information signal, c. second clock signal producing means, the clock of which has a fixed rate, greater than the clock rate of said first clock signal producing means, which is such that a signal, samples of which are in all stages of one of said analog shift registers, may be clocked out of said register by means of said second clock in a duration that is less than said predetermined duration, and d. logic means cooperative with said analog shift registers for successively enabling information signals in a train thereof to be clocked into respective analog shift registers by means of said first clock signal producing means, and for successively enabling signals to be clocked out of said analog shift registers by means of said second clock signal producing means.

6. The apparatus of claim 5 wherein said analog shift registers are charge coupled devices.

7. The apparatus of claim 5 wherein said plurality of analog shift registers is comprised of at least three analog shift registers, and wherein said logic means includes means adapted to delay the clock-out of each said analog shift register for a predetermined duration after its respective output stage has been loaded with a signal sample.

8. The apparatus of claim 7 wherein said analog shift registers are charge coupled devices.

9. In combination with apparatus for playing back recorded video signals which may be subject to time-wise stretch and compression thereof, the apparatus comprising:

a. a plurality of analog shift registers, b. means for clocking said video signals successively and respectively into said analog shift registers, the clock rate being fixed and such that samples of a video signal which has been stretched a predetermined amount will load all of the stages of an analog shift register during the time span of such stretched signal, c. means for clocking signal samples out of said analog shift registers at a fixed rate which will unload all samples of a signal which has been stretched said predetermined amount within the duration of a video signal which has neither been stretched nor compressed, and d. logic means for selectively clocking one video signal into one analog shift register and for simultaneously clocking a signal which is within another analog shift register out of said other analog shift register.

10. The apparatus of claim 9 wherein said analog shift registers are charge coupled devices.

* * * * *